(12) United States Patent
Gerardo

(10) Patent No.: US 7,592,542 B1
(45) Date of Patent: Sep. 22, 2009

(54) ADJUSTABLE FLOOR BRACKET ARTICLE AND METHOD

(75) Inventor: Joseph R. Gerardo, Victorville, CA (US)

(73) Assignee: Fabworks, LLC, Santa Ana, CA (US)

( * ) Notice: Subject to any disclaimer, the term of this patent is extended or adjusted under 35 U.S.C. 154(b) by 0 days.

(21) Appl. No.: 12/016,079

(22) Filed: Jan. 17, 2008

Related U.S. Application Data

(63) Continuation of application No. 10/865,152, filed on Jun. 9, 2004, now Pat. No. 7,394,020, which is a continuation of application No. 10/389,293, filed on Mar. 14, 2003, now Pat. No. 6,765,146.

(51) Int. Cl.
*H01H 9/02* (2006.01)

(52) U.S. Cl. .............. 174/58; 174/50; 174/53; 174/57; 174/61; 220/3.3; 220/3.7; 248/906

(58) Field of Classification Search .......... 174/50, 174/53, 480, 481, 58, 63, 64, 54, 57, 61, 174/62; 220/3.2–3.9, 4.02; 248/906, 300, 248/27.1, 205.1, 311.2; 439/535; 52/220.7, 52/220.8
See application file for complete search history.

(56) References Cited

U.S. PATENT DOCUMENTS

| | | |
|---|---|---|
| 1,774,934 A | 9/1930 | Mangin |
| 4,967,990 A | 11/1990 | Rinderer |
| 5,098,046 A | 3/1992 | Webb |
| 5,224,673 A | 7/1993 | Webb |
| 5,288,041 A | 2/1994 | Webb |
| 5,386,959 A | 2/1995 | Laughlin et al. |
| 5,423,499 A | 6/1995 | Webb |
| 5,931,425 A | 8/1999 | Oliva |
| 6,098,939 A | 8/2000 | He |
| 6,188,022 B1 | 2/2001 | He |
| 6,209,836 B1 | 4/2001 | Swanson |
| 6,323,424 B1 | 11/2001 | He |
| 6,484,980 B2 | 11/2002 | Medlin et al. |
| 6,573,449 B2 | 6/2003 | Vrame |
| 6,590,155 B2 | 7/2003 | Vrame et al. |
| 6,765,146 B1 * | 7/2004 | Gerardo ................ 174/58 |
| 6,803,521 B2 * | 10/2004 | Vrame ................ 174/58 |
| 6,996,943 B2 * | 2/2006 | Denier et al. ............. 174/50 |
| 7,053,300 B2 * | 5/2006 | Denier et al. ............. 174/58 |
| 7,271,335 B2 * | 9/2007 | Dinh ................... 174/58 |
| 7,271,336 B2 * | 9/2007 | Dinh ................... 174/58 |
| 7,394,020 B2 * | 7/2008 | Gerardo ................ 174/58 |

* cited by examiner

*Primary Examiner*—Angel R Estrada
(74) *Attorney, Agent, or Firm*—Fulwider Patton LLP

(57) ABSTRACT

A support bracket article for enabling the adjustable positioning of an electrical box enclosure relative to the bottom of a framing member, and the supporting thereof in an interior wall section of a wall system under construction. The article is able to guide the adjustable positioning of the electrical box enclosure. It is also able to accommodate the supporting and adjustable positioning of the electrical box enclosure in a variety of framing studs and wall systems.

15 Claims, 5 Drawing Sheets

ADJUSTABLE FLOOR BRACKET ARTICLE AND METHOD

CROSS-REFERENCE TO RELATED APPLICATION

This application is a continuation of application Ser. No. 10/865,152 filed Jun. 9, 2004 which is a continuation of Ser. No. 10/389,293, filed Mar. 14, 2003, now U.S. Pat. No. 6,765, 146.

BACKGROUND OF THE INVENTION

1. Field of the Invention

The present invention relates generally to electrical box enclosure articles and methods, and, more particularly, to a support bracket article and method for enabling the adjustable positioning of an electrical box enclosure relative to the bottom of an interior wall section framing member.

2. General Background and State of the Art

Electrical box enclosures are mounted in walls which include framing members during wall construction in structures. Such electrical box enclosures have been mounted onto studs in the wall, but it has been a problem to adjust the location of the electrical box enclosure relative to the position of the studs. They have also been mounted on the bottom of a framing member, providing additional versatility in the location thereof, but adjustment thereof relative to the bottom of the framing member has been difficult.

Therefore, there has existed a need for an article which is able to support an electrical box enclosure during wall construction so as to enable the adjustable positioning of the electrical box enclosure in relation to the bottom of a framing member. The present invention fulfills these needs.

INVENTION SUMMARY

Briefly, and in general terms, the present invention provides adjustable positioning and supporting of an electrical box enclosure in relation to the bottom of an interior wall section framing member.

The article enables an electrical box enclosure to be supported and adjustably positionable therein during wall construction, relative to the bottom of a framing member in an interior wall section. The article includes an adjustable positioning enabling section, for enabling the electrical box enclosure to be adjustably positionable therein. It also includes a supporting section, for supporting the adjustable positioning enabling section.

One aspect of the present invention is that the article provides adjustable portions, for enabling the article to accommodate the adjustable positioning of the electrical box enclosure in walls constructed of different types of framing studs.

Another aspect of the present invention is that the article provides portions for guiding the adjustable positioning of the electrical box enclosure.

A further aspect of the present invention is that the article includes portions for providing support for the electrical box enclosure in various types of wall systems under construction.

Other features and advantages will become apparent from the following detailed description, taken in conjunction with the accompanying drawings, which describe and illustrate, by way of example, the features of the invention.

DETAILED DESCRIPTION OF THE PREFERRED EMBODIMENTS

Figure 1:
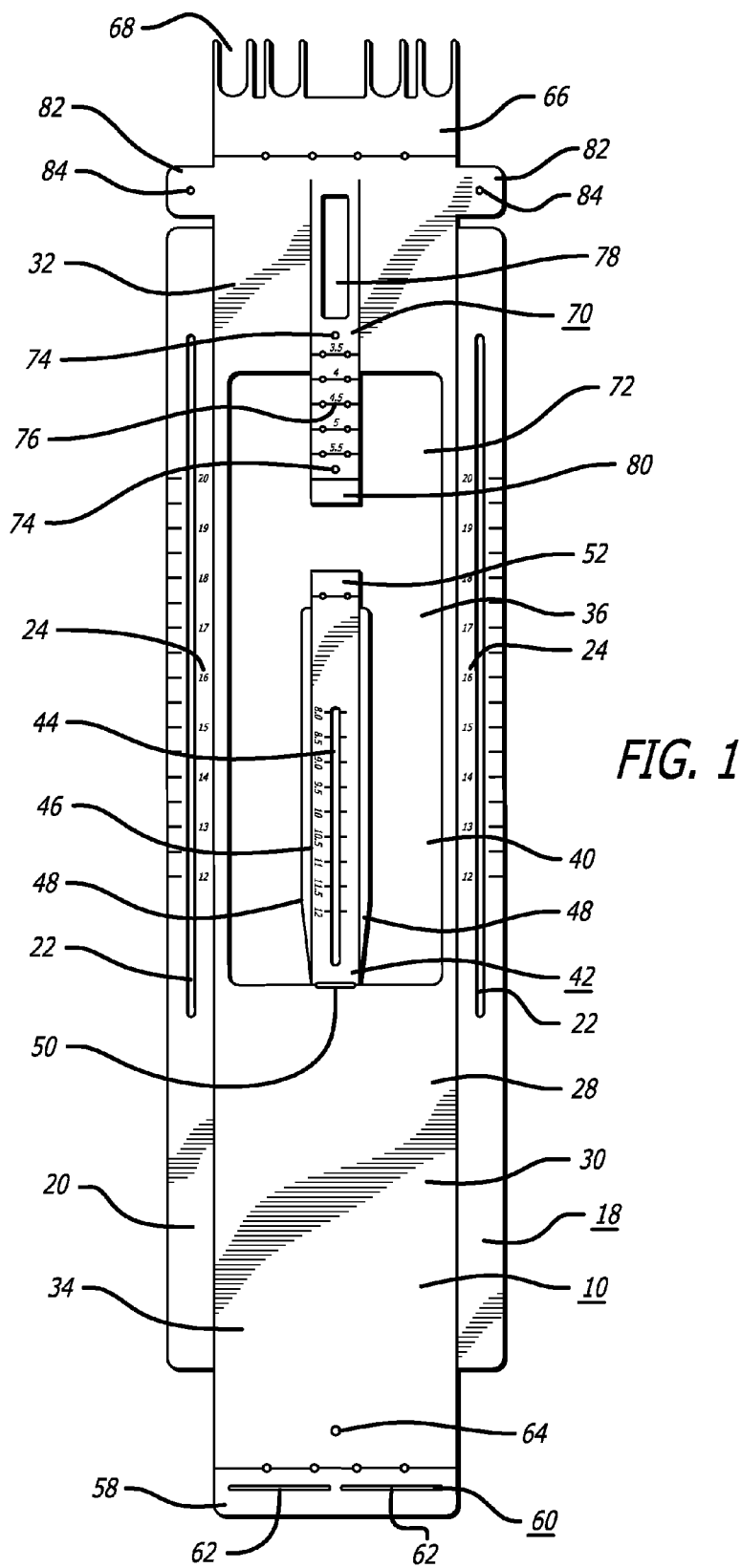
FIG. 1 is a front elevational view of a support bracket in accordance with the present invention.

Referring to the drawings, and in particular to FIGS. 1-7, there is shown an article 10, comprising a support bracket, for enabling an electrical box enclosure 12 (FIG. 4) to be adjustably positionable therein relative to the bottom of a framing member 14, in an interior wall section 16 during wall construction.

Figure 4:
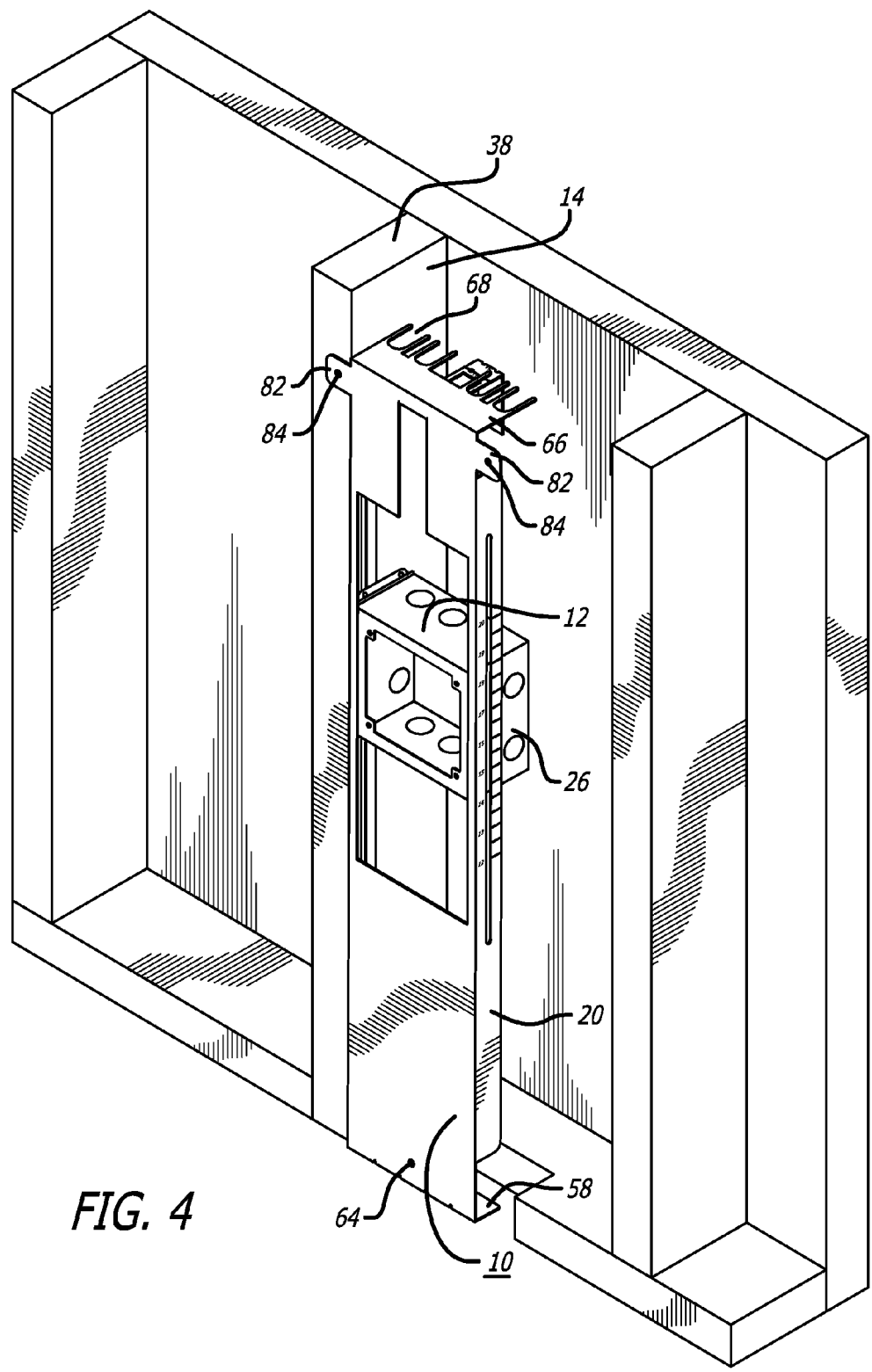
FIG. 4 is a perspective view of a support bracket article including bent and detached portions, and an electrical box enclosure supported therein, in a stud wall system, in accordance with the present invention.
Figures 5, 6:
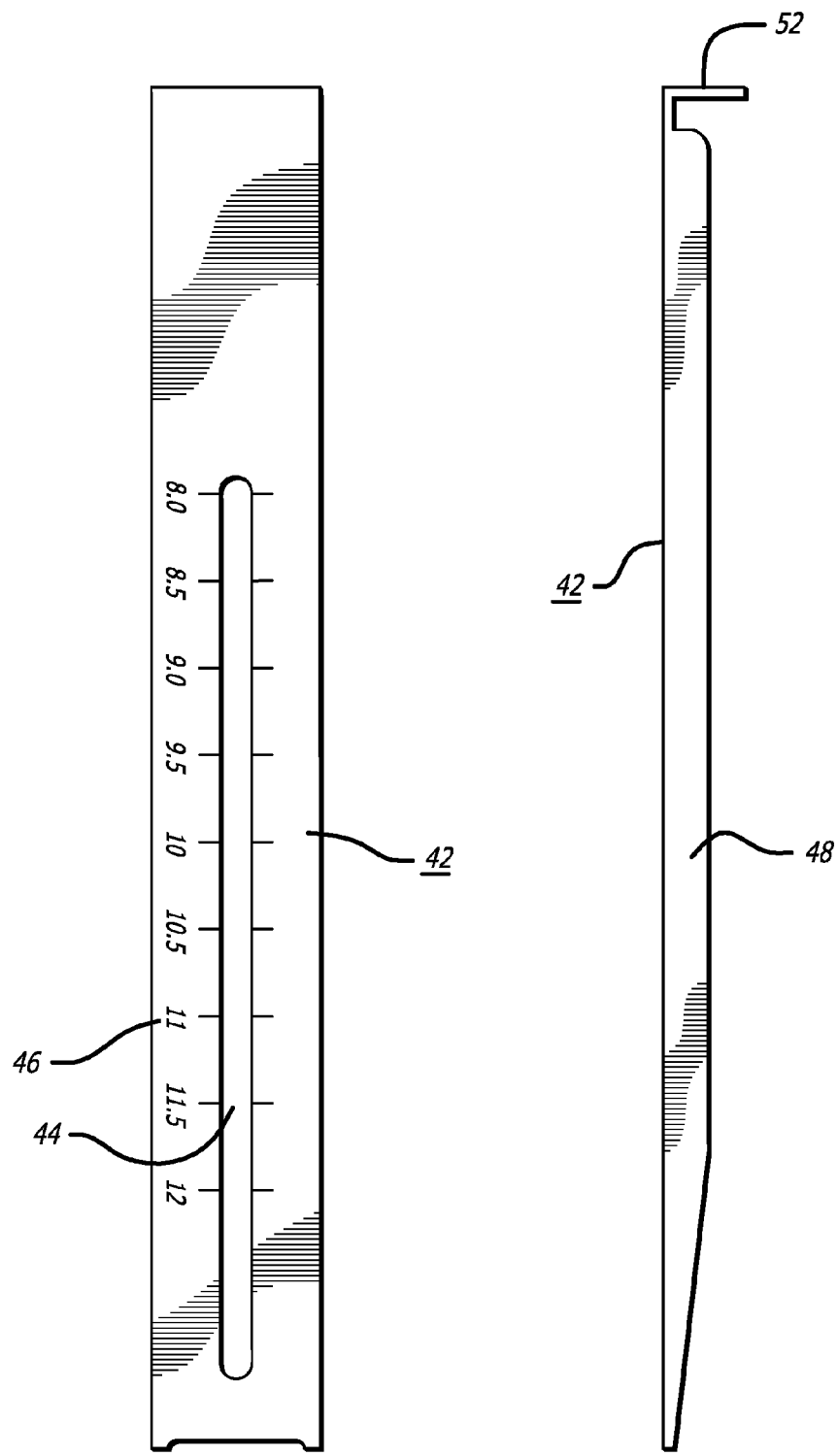
FIG. 5 is a front elevational view of a bracket extension arm section including a bent portion, of a support bracket article in accordance with the present invention.
FIG. 6 is a side elevational view of a bracket extension arm section of a support bracket article in accordance with the present invention.

The support bracket 10 includes an adjustable positioning enabling section 18 for enabling the electrical box enclosure to be adjustably positionable therein. The adjustable positioning enabling section 18 includes side positioning portions 20 of the support bracket 10, shown in template form in FIG. 1, which are bendable at about ninety degrees to form a channel guide for the electrical box enclosure 12, as seen in FIG. 4. The side positioning portions 20 each have a slot 22 extending therealong, for enabling adjustable positioning of the electrical box enclosure 12 in the support bracket 10. The slots 22 allow for up and down adjustment of the electrical box enclosure 12, as well as a machine screw attachment of the electrical box enclosure 12 to a floor bracket. The side positioning portions 20 each also include indicia 24 along the slot 22 therein, for indicating the adjustable positioning for the electrical box enclosure 12 therein. The electrical box enclosure 12 includes a pair of sides 26, and a pair of pointers, one on each side, and the indicia 24 in the support bracket 10 are alignable with the pointers on the electrical box enclosure 12 for alignment thereof.

The support bracket 10 further includes a supporting section 28, for supporting the adjustable positioning enabling section 14. The supporting section 28 includes a front portion 30 of the support bracket 10. The front portion 30 includes an upper portion 32 and a lower portion 34, and has an opening 36 for enabling the electrical box enclosure 12 to be mounted therein. A framing member 14 in an interior wall section 16 includes one of a plurality of different thickness framing studs 38.

The front portion opening 36 of the support bracket 10 includes a bottom portion 40, and a bracket extension arm 42 which extends from the lower portion 34 of the support bracket front portion 30 into the bottom portion 40 of the opening 36, as seen in FIGS. 1 and 5-7. The bracket extension arm 42 is bendable, and enables the securing of the support bracket 10 to one of the plurality of different thickness framing studs 38. The bracket extension arm 42 has a slot 44 extending therealong, for enabling a slide type adjustment over the front portion 30 of the support bracket 10. The bracket extension arm 42 also includes indicia 46 along the slot 44 therein, and elongated side portions 48, which are bendable. The bracket extension arm 42 further includes a separation-enabling portion 50, for enabling separation thereof from the front portion 30. The bracket extension arm 42 also includes an end flange 52 which is bendable.

Figure 7:
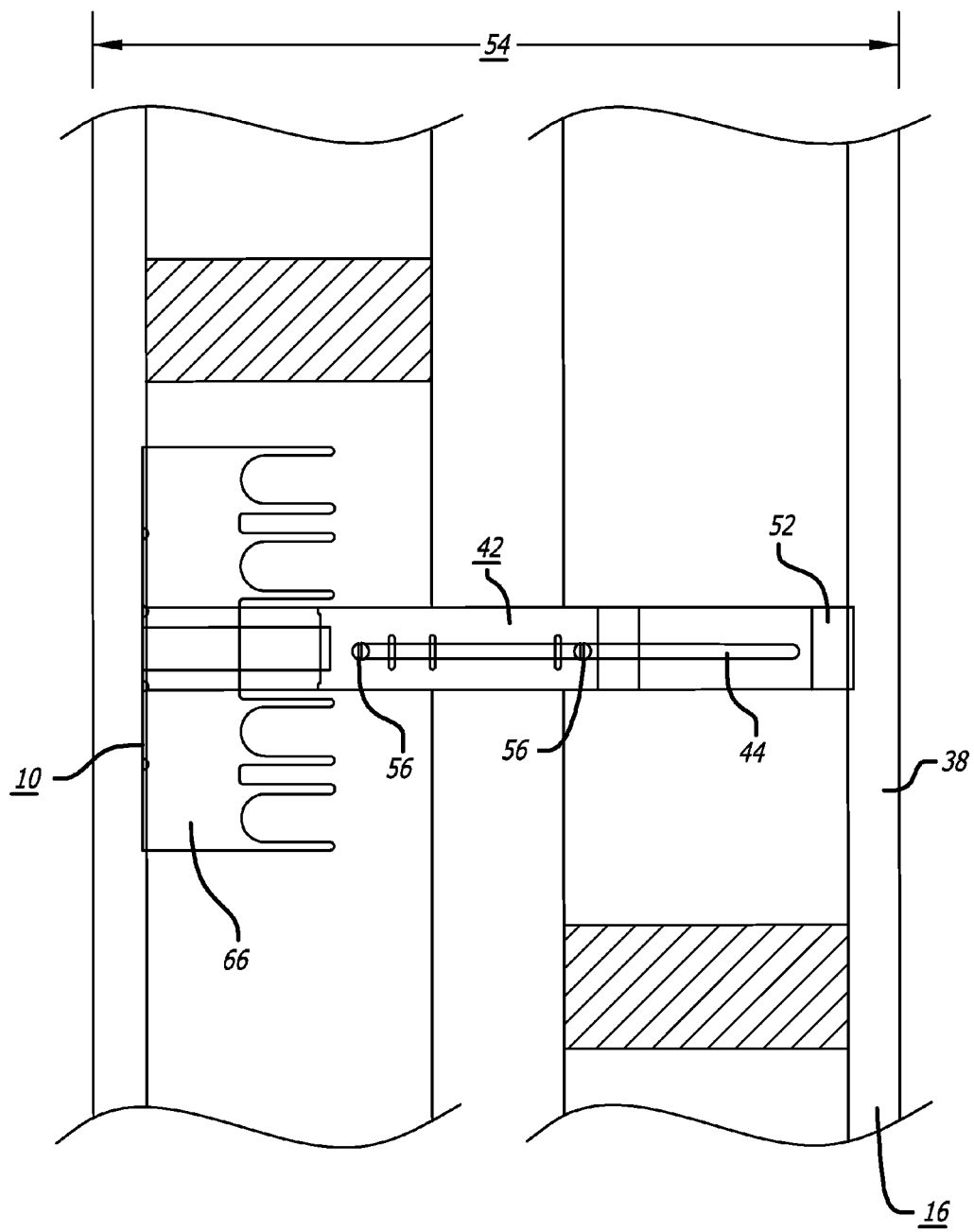
FIG. 7 is a top plan view of a bracket extension arm section of a support bracket article in a stud wall system in accordance with the present invention.

As depicted in top view in FIG. 7, the end flange 52 of the bracket extension arm 42 is bent approximately ninety degrees after tool forming, to provide a flat surface area for the bracket extension arm 42, when pushed against the inside of the interior wall material. An overall outside dimension 54 of a pair of finished wall surfaces may vary depending upon construction plan drawings or specifications for a particular project. A pair of accessible screws 56 enable adjustment of the bracket extension arm 42 within the interior of the wall. The end flange 52 of the bracket extension arm 42 bears against one side while supporting the upper portion of the support bracket 10 in stud wall systems against the exterior of the opposite side. The bracket extension arm 42 is able to support the upper portion of the support bracket 10 in stud wall systems beyond stud wall construction, such as in a staggered or double wall stud wall system as shown in FIG. 7.

The lower portion 34 of the front portion 30 of the support bracket 10 includes a bottom portion 58 which is bendable. The bottom portion 58 includes a separation-enabling portion 60 for enabling separation of the bottom portion 58 from the front portion 30. The separation-enabling portion 60 further comprises a pair of slots 62 extending along the bottom portion 58. The lower portion 34 of the support bracket front portion 30 further includes a hole 64 for enabling the securing of the support bracket 10 to the bottom of the framing member 14. The upper portion 32 of the support bracket front portion 30 further includes a top portion 66 which is bendable. The top portion 66 includes a plurality of slots 68, each able to receive a cable therein. Each of the plurality of slots 68 is generally u shaped.

The front portion 30 of the support bracket 10 also includes an upper support arm 70 which extends from the support bracket upper portion 32 into an upper portion 72 of the support bracket front portion opening 36, which is bendable, and which enables securing thereof to the framing member 14. The upper support arm 70 includes a plurality of holes 74 therein for enabling the securing thereof to the framing member 14. The framing member 14 in the interior wall section 16 includes one of a plurality of different thickness framing studs 38. The upper support arm 70 also includes indicia 76 associated therewith. The associated indicia 76 enables the securing of the upper arm support 68 to one of the plurality of different thickness framing studs 38. The upper support arm 68 further includes a strengthening portion 78 for strengthening the support bracket 10, and an end flange 80 which is bendable.

The support bracket 10 also includes side tab portions 82 which enable mounting of the article to the framing member 14. Each side tab portion 82 has a hole 84 therein for enabling mounting of the support bracket 10 to the framing member 14.

As illustrated in FIGS. 1-7, in a method for use of the article 10, the user may utilize the support bracket 10 to adjustably position the electrical box enclosure, by the adjustable positioning enabling section 18 thereof, and may support the support bracket 10 by the supporting section 28 thereof.

Figures 2, 3:
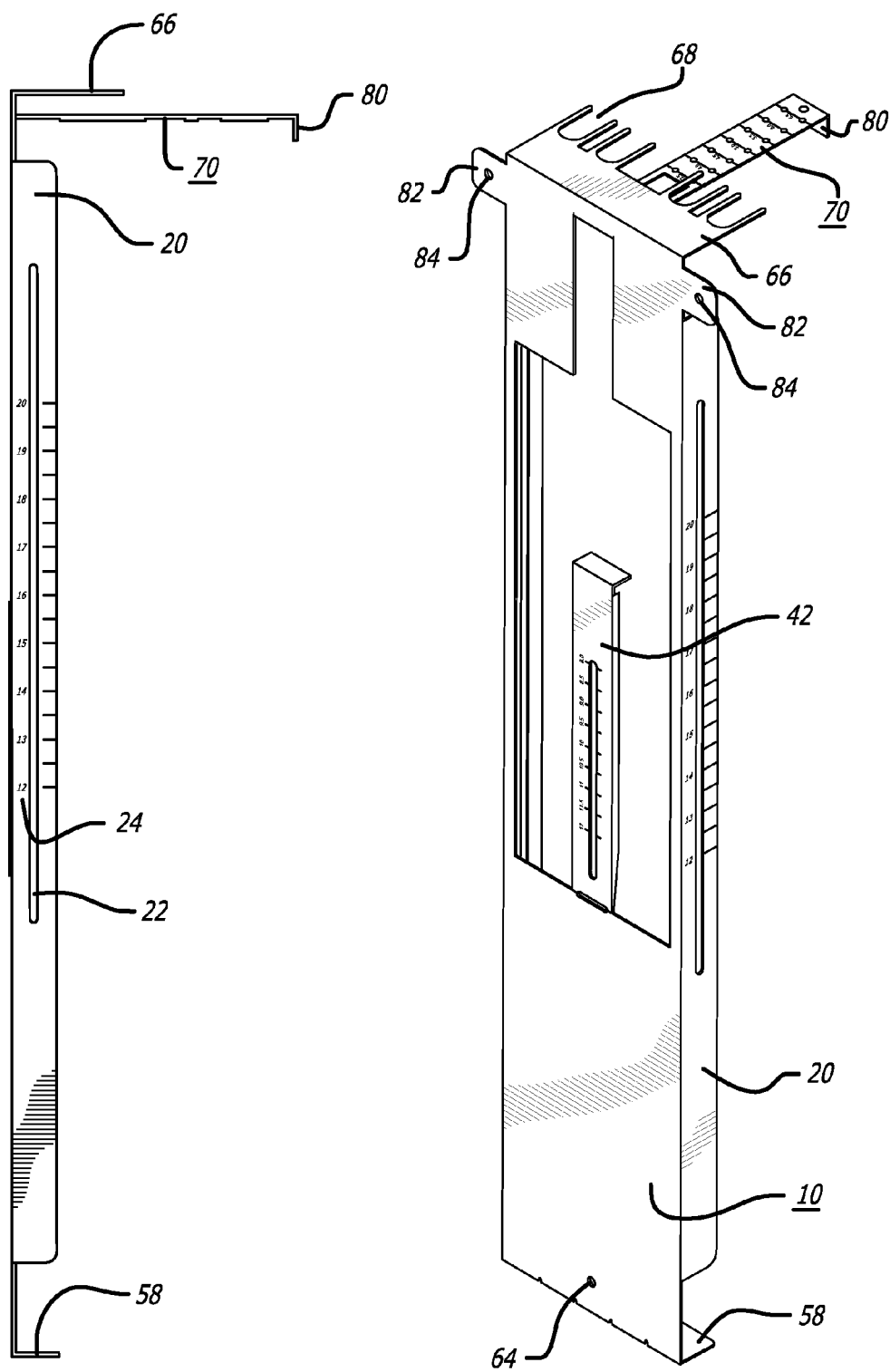
FIG. 2 is a side elevational view of a support bracket article including bent portions in accordance with the present invention.
FIG. 3 is a perspective view of a support bracket article including bent portions in accordance with the present invention.

Initially the support bracket 10 is a flat template, as shown in FIG. 1, which may be formed by bending the sections thereof. The bottom portion 58 may be bent ninety degrees to form a foot for the support bracket 10, as seen in FIG. 2. The slots 62 in the bottom portion 58 enable the breaking off thereof for the installation of the support bracket 10 on wood framing, or if the support bracket 10 cannot be positioned inside the bottom track of a metal stud. The support bracket 10 may be secured to the bottom of a framing member through the holes 64, as illustrated in FIG. 4.

The side positioning portions 20 of the support bracket 10 are able to be bent ninety degrees to form a channel guide for the electrical box enclosure 12. The slots 22 one on each side of the support bracket 10, enable up and down adjustment of the electrical box enclosure 12, and also enable attachment of the support bracket 10 to the electrical box enclosure 12 by inserting machine screws therethrough. The indicia 24 on the side positioning portions 20, such as tic marks and numbers, indicate the height to the center of the electrical box enclosure 10 above the finished floor or the top of a grade surface. The electrical box enclosure 12 includes arrow shaped pointers, one on each side thereof and centered, to enable alignment of the tic marks on the side positioning portions 20 therewith, for precise height adjustment of the electrical box enclosure 12. The opening 36 in the front portion 30 of the support bracket 10 enables vertical adjustment of the electrical box enclosures 12 while attached to the support bracket 10. The side tab portions 82 of the support bracket 10 are able to be bent ninety degrees, as indicated in FIG. 2, to enable securing of the upper portions 32 of the support bracket 10 to a framing stud 38. The top portion 66 of the support bracket 10 may also be bent ninety degrees, and the slots 68 therein enable cables or conduits to be secured therein by crimping together and twisting the ends thereof to tie off cables or conduits using hand tools.

In the upper support arm 70, the holes 74 enable the attachment of a bracket extension arm 42 thereto by self-tapping fasteners inserted therethrough. The upper indicia 76 of the upper support arm 70 provide a point for the installer to bend the upper portion of the upper support arm 70 ninety degrees for forming thereof for use in the construction of walls comprised for example of three-and-one-half inch framing studs. The middle indicia 76 of the upper support arm 70 provide a point for the installer to bend the upper portion of the upper support arm 70 ninety degrees for forming thereof for use in the construction of walls comprised for example of four inch framing studs. The lower indicia 76 of the upper support arm 70 provide a point for the installer to bend the upper portion of the upper support arm 70 ninety degrees for forming thereof for use in the construction of walls comprised for example of five-and-one-half inch framing studs. The end flange 80 of the upper support arm 70 may be bent ninety degrees after forming thereof, for use in the construction of walls comprised for example of six inch framing studs.

Strengthening portions 78 of the upper support arm 70 strengthen and enhance the performance characteristics of the support bracket 10. In the bracket arm extension 42, the elongated slot 44 enables the snapping or breaking off thereof, for use with the upper support arm 70 to provide support in interior walls for example of greater than six inch depth, such as a staggered stud wall system in FIG. 7. The elongated side portions 48 strengthen the bracket extension arm 42, and the slot 44 enables slide-type adjustment therealong. The end flange 52 may be bent ninety degrees, to provide a flat surface area for the bracket extension arm 42 upon being pushed against the inside of the interior wall member, so as to press against the interior of one side of a staggered wall stud system and to support the top portion 66 of the upper support arm 70 against the interior of the opposite side of the staggered stud wall system. The overall outside dimension 54 of the finished wall surfaces may vary depending upon the construction plan drawings or specifications of a particular project. The screws 56, which extend through the slot 44 in the bracket extension arm 42, enable adjustment of the positioning thereof within the wall interior.

From the foregoing it will be appreciated that the system of the present invention provides advantages during wall construction, in enabling the adjustable positioning of an electrical box enclosure in relation to the bottom of a framing member in an interior wall section. While several particular forms of the invention have been illustrated and described, it will be apparent that various modification can be made without departing from the spirit and scope of the invention. Accordingly, the invention is not to be limited, except as by the following claims.

I claim:

1. An article for enabling an electrical box enclosure to be adjustable positionable therein relative to the bottom of a framing member in an interior wall section during wall construction, comprising a support bracket, which comprises:
   an adjustable positioning enabling section for enabling the electrical box enclosure to be adjustable positionable therein;
   a supporting section, for supporting the adjustable positioning enabling section, including a front portion of the article, and having an opening for enabling the electrical box enclosure to be mounted therein; and
   side tab portions, adapted to enable mounting of the article to the framing member, wherein the framing member in the interior wall section includes one of a plurality of different thickness framing studs, the article front portion opening includes a bottom portion, and the article front portion includes a bracket arm extension, which extends from the bottom portion of the front portion opening, and which is bendable and adapted to enable securing of the article to one of the plurality of different thickness framing studs.

2. The article of claim 1, wherein the bracket arm extension has a slot extending therealong.

3. The article of claim 1, wherein the bracket arm extension includes elongated side portions.

4. The article of claim 1, wherein the bracket arm extension includes a separation-enabling portion for enabling separation thereof from the front portion.

5. The article of claim 1, wherein the bracket arm extension includes an end flange which is adapted to be extendable.

6. An article for enabling an electrical box enclosure to be adjustable positionable therein relative to the bottom of a framing member in an interior wall section during wall construction, comprising a support bracket which comprises:
   an adjustable positioning enabling section for enabling the electrical box enclosure to be adjustable positionable therein;
   a supporting section, for supporting the adjustable positioning enabling section including a front portion of the article, including a bottom portion which is bendable; and
   side tab portions, adapted to enable mounting of the article to the framing member, wherein the bottom portion includes a separation-enabling portion for enabling separation of the bottom portion from the front portion.

7. The article of claim 6, wherein the separation-enabling portion comprises a slot extending along the bottom portion.

8. A method of enabling an electrical box enclosure to be adjustable positionable therein relative to the bottom of a framing member in an interior wall section during wall construction, in an article comprising a support bracket, which comprises an adjustable positioning enabling section for enabling the electrical box enclosure to be adjustable positionable therein, a supporting section, for supporting the adjustable positioning enabling section, including a front portion of the article, and having an opening for enabling the electrical box enclosure to be mounted therein, and side tab portions, adapted to enable mounting of the article to the framing member, wherein the method comprises:
   adjustable positioning the electrical box enclosure, by the adjustable positioning enabling section of the support bracket;
   supporting the support bracket adjustable positioning enabling section, by the supporting section of the support bracket, further comprising supporting by the article front portion, and mounting the electrical box enclosure in the article front portion opening; and
   mounting the article to the framing member, by the side tab portions, wherein the framing member in the interior wall section includes one of a plurality of different thickness framing studs, the article front portion opening includes a bottom portion, and the article front portion includes a bracket arm extension, which extends from the bottom portion of the front portion opening, and which is bendable, adapted to enable securing of the article to one of the plurality of different thickness framing studs, further comprising securing the article to one of the plurality of different thickness framing stubs by the article front portion bendable bracket arm extension.

9. The method of claim 8, wherein the bracket arm extension has a slot extending therealong, and wherein securing further comprises securing the article by the bracket arm extension slot.

10. The method of claim 8, wherein the bracket arm extension includes a separation-enabling portion for enabling separation thereof from the front portion, further comprising separating the bracket arm extension from the front portion by the bracket arm extension separation-enabling portion.

11. The method of claim 8, wherein the bracket arm extension includes an end flange which is adapted to be extendable, further comprising extending the bracket arm extension extendable end flange.

12. A method of enabling an electrical box enclosure to be adjustably positionable therein relative to the bottom of a framing member in an interior wall section during wall construction, in an article comprising a support bracket, which comprises an adjustable positioning enabling section for enabling the electrical box enclosure to be adjustably positionable therein, a supporting section, for supporting the adjustable positioning enabling section, including a front portion of the article, and a bottom portion which is bendable, and side tab portions, adapted to enable mounting of the article to the framing member, wherein the method comprises:
   adjustably positioning the electrical box enclosure, by the adjustable positioning enabling section of the support bracket;
   supporting the support bracket adjustable positioning enabling section, by the supporting section of the support bracket, further comprising mounting the electrical box enclosure in the article front portion opening bendable bottom portion; and mounting the article to the framing member by the side tab portions, wherein the bottom portion includes a separation-enabling portion for enabling separation of the bottom portion from the front portion, further comprising separating the bottom portion from the front portion, by the bottom portion separation-enabling portion.

13. The method of claim 12, wherein the separation-enabling portion comprises a slot extending along the bottom portion, and wherein separating further comprises separating by the separation-enabling portion slot.

14. A method of enabling an electrical box enclosure to be adjustably positionable therein relative to the bottom of a framing member in an interior wall section during wall construction, in an article comprising a support bracket, which comprises an adjustable positioning enabling section for enabling the electrical box enclosure to be adjustably positionable therein, a supporting section, for supporting the adjustable positioning enabling section, including a front portion of the article, an upper support arm which is bendable, and which is adapted to enable securing thereof to the frame member, and side tab portions, adapted to enable mounting of the article to the framing member, wherein the method comprises:

adjustably positioning the electrical box enclosure, by the adjustable positioning enabling section of the support bracket;

supporting the support bracket adjustable positioning enabling section, by the supporting section of the support bracket, further comprising securing the article to the framing member by the article front portion bendable upper support arm; and mounting the article to the framing member, wherein the framing member in the interior wall section includes one of a plurality of different thickness framing studs, the article upper support arm includes indicia associated therewith, and the associated indicia are adapted to enable the positioning of the upper arm support relative to one of the plurality of different thickness framing studs, and wherein securing further comprises securing the article upper arm support to one of the plurality of different thickness framing studs, by the article upper support elongated openings associated indicia.

15. The method of claim 14, wherein the upper support arm includes an end flange which is adapted to be bendable, and wherein securing further comprises securing by the upper support arm bendable end flange.

\* \* \* \* \*